United States Patent [19]

Kamikawa

[11] B 3,990,323
[45] Nov. 9, 1976

[54] DEVICE FOR ROTATING A SPOOL OF A FISHING REEL

[75] Inventor: Kiyohide Kamikawa, Sakai, Japan

[73] Assignee: Shimano Industrial Company, Limited, Osaka, Japan

[22] Filed: Oct. 29, 1974

[21] Appl. No.: 518,999

[44] Published under the second Trial Voluntary Protest Program on February 3, 1976 as document No. B 518,999.

[30] Foreign Application Priority Data

Nov. 7, 1973  Japan.................... 48-129409[U]

[52] U.S. Cl. .................................. 74/546; 74/547; 242/84.1 J; 403/4
[51] Int. Cl.² ............................................ G05G 5/06
[58] Field of Search ............. 74/547, 546, 545, 525, 74/524; 403/3, 4; 242/84.1 J

[56] References Cited
UNITED STATES PATENTS

| 713,371 | 11/1902 | Adams | 242/84.1 J |
| 2,107,875 | 2/1938 | Pitney | 74/546 |
| 3,011,362 | 12/1961 | Cronholm | 74/546 |
| 3,153,950 | 10/1964 | Andrews | 74/546 |

Primary Examiner—Samuel Scott
Assistant Examiner—F. D. Shoemaker
Attorney, Agent, or Firm—Stevens, Davis, Miller & Mosher

[57] ABSTRACT

A device for rotating a spool of a fishing reel, comprises a handle stud connected co-operatively with one spool for winding up a fishing line thereon and an operating handle mounted to the end of the handle stud, which operating handle is formed of two arms so as to make changeable the distance between a handle grip and the handle stud, whereby the spool may be rotated to wind up the line thereon with a greater strength from an elongated handle arm for fishing for big game-fish, while, it may be nimbly rotated with a shortened handle arm for fishing for small fish.

3 Claims, 3 Drawing Figures

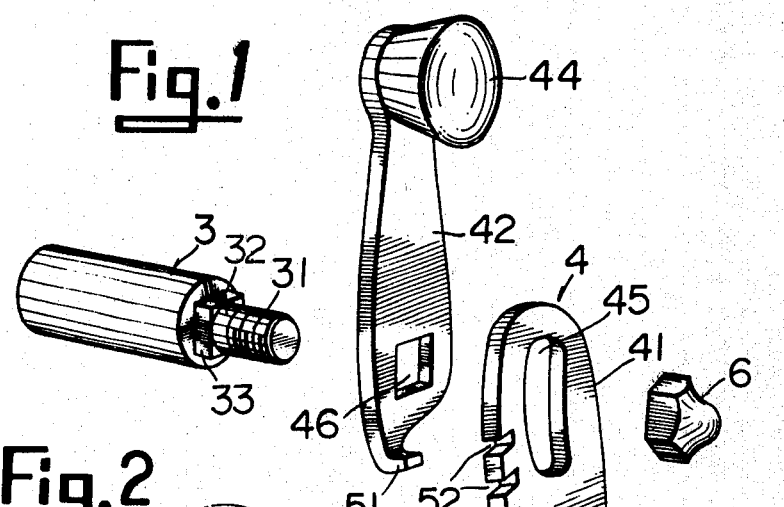
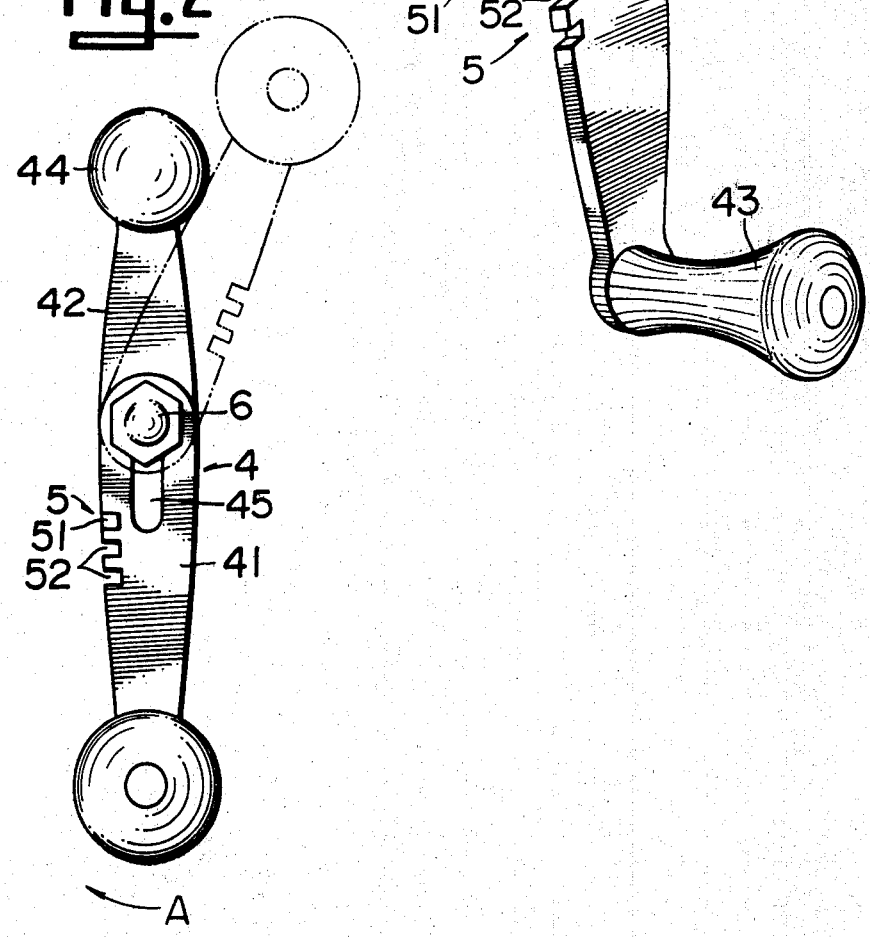

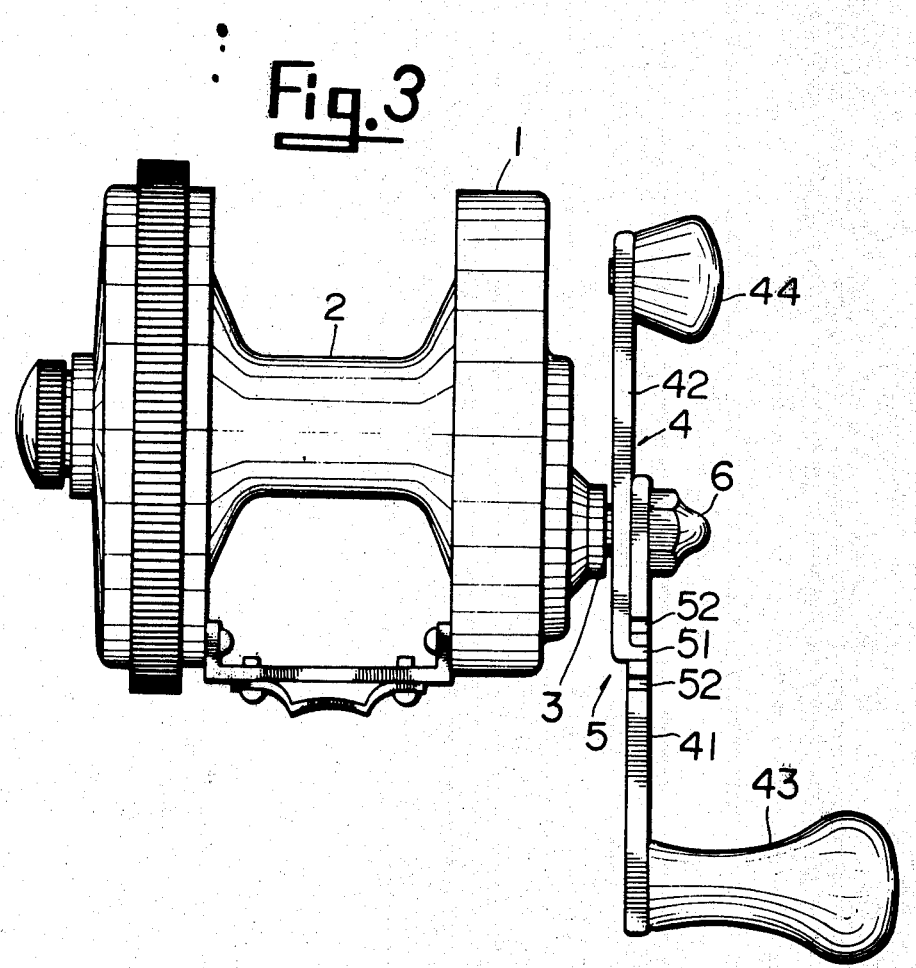

DEVICE FOR ROTATING A SPOOL OF A FISHING REEL

This invention relates to a device for rotating a spool of a fishing reel having the spool for winding up a fishing line thereon, and more particularly to a device which comprises a handle stud connected co-operatively with the spool and an operating handle mounted to one end of the stud so that the spool may be rotated with the operating handle through the handle stud.

Conventionally, this kind of a fishing reel is provided with a spool rotatable with a stud cooperative therewith and with an operating handle fitted to the stud and having at both ends a handle grip and a balancer so that the spool may be rotated with the operating handle through the stud for winding up a fishing line on the spool. In an actual use of this reel, it is desireable that an angler be able to apply a greater torque on the spool in order to catch easily a large fish even with low strength for rotating the handle. On the other hand, the angler can lightly rotate the handle to catch a small fish.

A conventional fishing reel has, however, no means for meeting the abovementioned requirement. Consequently a fishing reel designed for light rotation of the operating handle, namely, a reel provided with an operating handle having an arm short in length between a handle grip and a handle stud thereof, is easy to be operated rapidly and lightly, while, the operation of the handle becomes heavier for fishing for big game resulting in difficulty in winding up the line. On the other hand, a fishing reel made for the purpose that a minor rotatory force applied on the handle causes the spool to be rotatable with a greater torque, namely, a reel provided with an operating handle having a longer arm between a handle grip and a handle stud, may be operable lightly even when fishing for a big game-fish, but there has been the problem that too long an operating handle makes it difficult to quickly wind up the fishing line.

Furthermore, the operating handle protrudes at the lengthwise outer end thereof outwardly of the reel body; therefore, when brought to or from the fishing place, the reel may be bent or damaged at the handle arm thereof.

This invention has been designed to solve the abovementioned problem, of which an object is the provision of a device for rotating a spool of a fishing reel to quickly wind up a fishing line on the spool with the nimble and light operation of a handle used for fishing for small game-fish, while when used, for fishing for big fish the increased rotatory force of the operating handle is made to be transmitted to a spool so that the spool may exactly wind up the line with the greater torque applied thereto.

Another object of the invention is the provision of a device for rotating a spool of a fishing reel, in which there is no possibility that an operating handle is bent or damaged when brought to or from the fishing place.

Still another object of the invention is the provision of a device for rotating a spool of a fishing reel, which is very simple in construction and cheap in the manufacturing cost.

Other objects and merits of the invention will be apparent from following description in accordance with the accompanying drawings, in which FIG. 1 is a perspective exploded view of a device of the invention, FIG. 2 is a side view of the assembly thereof, and FIG. 3 is a rear view thereof attached to a fishing reel body.

A device for rotating a spool in accordance with the invention, comprises a handle stud 3 connected cooperatively with a spool 2 supported to a main body 1 of a fishing reel and an operating handle 4 fitted to one end of the handle stud 3. Additionally, the construction of the reel body 1 provided with the device of the invention has been well known so that the details thereof are deleted from the description.

The handle stud 3 is rotatably supported to the reel body 1 and cooperatively connected with the spool 2 through a driving force transmitting means such as a gear means. The stud has a screw thread 31, a circular sectional portion 32 and a square sectional portion 33, formed in order from the outer end of the stud.

The operating handle 4 is formed of two plate-like handle arms 41, 42, of which one arm 41 is provided at one end thereof with a grip 43 molded of synthetic resin and in a rotatable relationship with the arm 41, and at the other end thereof with a slot 45 elongated longitudinally of the arm 41 and perforated therethrough. The other arm 42 has at one end a metallic balancer 44 fixed thereto and at the other end a square hole 46 perforated through the same. The slot 46 and the hole 46 are tightly insertibly mounted into the circular sectional portion 32 and the square sectional portion 33 of the stud 3 respectively. The slot 45 has a minor diameter slightly larger than the diameter of the circular sectional portion 32, and the square hole 46 has each one side slightly longer than that of the square sectional portion 33.

There is provided a means 5 for integrally connecting both the arms 41, 42 with each other, which comprises a pawl 51 formed at the foremost end of the one handle arm 42 and a plurality of notched portions 52 formed at the other arm 41 closely to the slot 45 so that the pawl 51 becomes engageable with each of the notched portions, thereby integrally connecting both handle arms 41 and 42 with each other. The pawl 51 is, as shown in FIG. 1, formed of a bent end of the arm 42 and the notched portions 52 are formed in recesses at one side of the handle arm 41.

The numeral reference 6 designates a cap nut representing a fixing means for fixing the operating handle 4 to the stud 3, which cap nut 6 is screwably engaged with a screw thread 31 at the outer periphery of the circular-sectional portion 32 of the stud 3 for holding the operating handle 4 to an extent of the arm 41 rotation sufficient to be rotatable relatively to the stud.

As is apparent from the abovementioned construction of the device of the invention, there are such advantages that an angler can bring the reel to or from the fishing place in a state that one handle arm 41 is made to be turned around the stud 3 to be kept in the position shown with the phantom line in FIG. 2 so that the operating handle 4 may be prevented from being bent or damaged, and that the reel is available at the fishing place by reverse turn of the handle arm 41 from the abovementioned position so as to be integrally connected in line with the other arm 42 by means of selective engagement of the pawl 51 with one of the notched portions 52. As a result, the rotation of the handle arm 41 in the direction a of an arrow in FIG. 2 by the angler's handling of the grip 43, may be transmitted to the other arm 42 through the engageable means 5, to the stud 3 from the arm 42 through the square hole 46 and the square sectional portion 33 of the stud 3, and then to the spool 2 from the stud 3, thus making the spool rotatable. Hence, in an actual use of the reel the selective engagement of the pawl with each of the notched portions makes a variable length between the handle stud 3 and the handle grip 43 of the operating handle 4. For example, the length may be reduced for making the operating handle 4 very nimbly and lightly rotatable and may be increased to permit the same to be operable with a greater torque for transmitting the increased rotatory force to the handle stud 3.

While an embodiment of the invention has been shown and described, the invention is not limited to the specific construction thereof, which is merely exemplified in the specification.

What is claimed is:

1. A device for rotating a spool of a fishing reel to wind a fishing line about the spool, comprising:
    a. a handle stud means, connected to the spool, for rotating said spool;
    b. an operating handle, mounted on one end of said handle stud means, including a first elongated handle arm and a second elongated handle arm, said first arm having at one end a handle grip and at the other end an elongated slot extending longitudinally of and through said first arm, said second arm having at one end a balance and at the other end a square hole through said second arm, said elongated slot and said square hole overlapping one another and said handle stud means extending through said slot and hole;
    c. means for integrally engaging said first and second arms in a substantially straight line, said engaging means including an engageable portion formed on one of said first and second arms and a plurality of notched portions formed on the other of said first and second arms, said notched portions being spaced apart in the longitudinal direction of said other of said arms, said engageable portion being receivable in one of said notched portions; and
    d. means, connected to said stud means, for fixing said operating handle to said stud means.

2. A device according to claim 1 wherein said handle stud means includes at said one end a first part having a square sectional shape and a second part having a circular sectional shape with a screw thread at the outer periphery of said second part, said slot being of elongated circular shape and being positioned at said second part and having a minor diameter slightly larger than that of said second part, whereby said first arm is rotatable and axially movable relative to said second part, and said square hole being positioned on said first part and being prevented from rotating relative to said handle stud means.

3. A device according to claim 1 wherein said engageable portion includes a bent end at said other end of one of said first and second arms and said plurality of notched portions are formed at one side of the other of said first and second arms.

* * * * *